(12) United States Patent
Lim et al.

(10) Patent No.: US 9,030,154 B2
(45) Date of Patent: May 12, 2015

(54) APPARATUS AND METHOD FOR PREVENTING BATTERY FROM BEING OVERCHARGED

(75) Inventors: Hae Kyu Lim, Songpa-gu (KR); Mi Ok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 654 days.

(21) Appl. No.: 13/312,915

(22) Filed: Dec. 6, 2011

(65) Prior Publication Data

US 2012/0313573 A1 Dec. 13, 2012

(30) Foreign Application Priority Data

Jun. 10, 2011 (KR) ........................ 10-2011-0056001

(51) Int. Cl.
*H01M 10/46* (2006.01)
*H02J 7/00* (2006.01)

(52) U.S. Cl.
CPC ....... *H02J 7/0029* (2013.01); *H02J 2007/0037* (2013.01)

(58) Field of Classification Search
USPC .................. 320/107, 112, 114, 115, 150, 153
See application file for complete search history.

(56) References Cited

U.S. PATENT DOCUMENTS

| 2006/0093896 A1* | 5/2006 | Hong et al. ..................... 429/61 |
| 2007/0054157 A1* | 3/2007 | Ryu et al. ......................... 429/7 |
| 2007/0122691 A1* | 5/2007 | Lee et al. ......................... 429/61 |
| 2008/0116851 A1* | 5/2008 | Mori ............................. 320/134 |
| 2011/0189515 A1* | 8/2011 | Yoon et al. ..................... 429/61 |

FOREIGN PATENT DOCUMENTS

| JP | 07-254402 | 10/1995 |
| JP | 2008-123886 A | 5/2008 |
| KR | 10-2006-0065001 A | 6/2006 |
| KR | 10-2006-0110576 | 10/2006 |
| KR | 10-2006-0114549 | 11/2006 |
| KR | 10-2009-0052802 | 5/2009 |

* cited by examiner

*Primary Examiner* — Edward Tso
(74) *Attorney, Agent, or Firm* — Mintz Levin Cohn Ferris Glovsky and Popeo, P.C.; Peter F. Corless

(57) ABSTRACT

Disclosed is an apparatus for preventing a battery from overcharging. In particular, the apparatus includes a battery module which has a plurality of battery cells and a battery controller that is connected to the battery module. The battery controller has a voltage sensor. A mounting frame is arranged a predetermined distance from the battery module, and is made of a conductor to which a ground is connected. The battery controller determines that overcharging to the battery module has occurred when the voltage sensor senses a low voltage due to the battery module coming in contact with the mounting frame because of swelling.

12 Claims, 4 Drawing Sheets

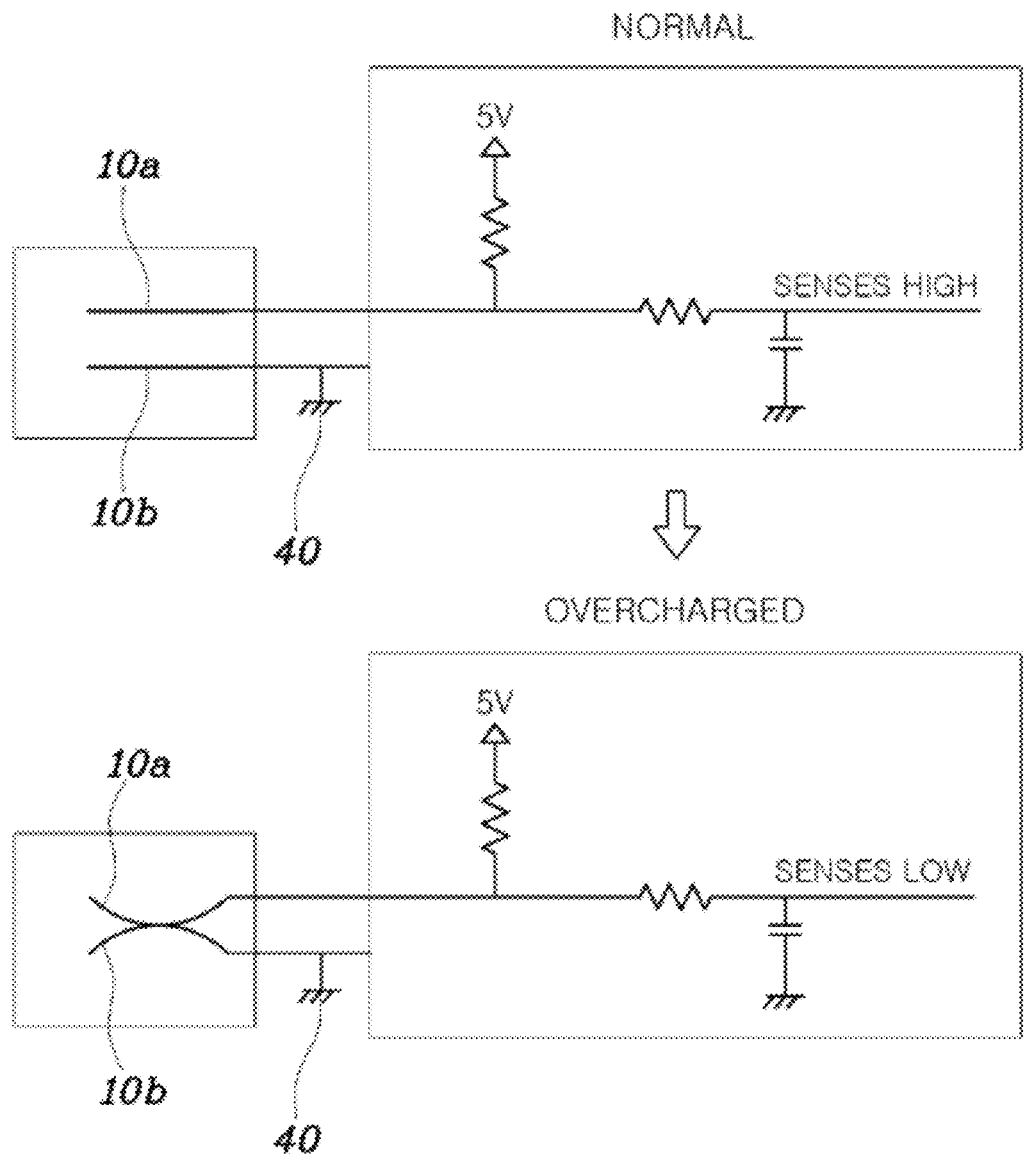

APPARATUS AND METHOD FOR PREVENTING BATTERY FROM BEING OVERCHARGED

CROSS-REFERENCE TO RELATED APPLICATIONS

This application claims under 35 U.S.C. §119(a) priority to Korean Application No. 10-2011-0056001, filed on Jun. 10, 2011, the disclosure of which is incorporated herein by reference in its entirety.

BACKGROUND OF THE INVENTION

1. Field of the Invention

The present invention relates, in general, to an apparatus for preventing a battery from overcharging and, more particularly, to an apparatus for preventing a battery from becoming overcharged before the battery fails and for preventing a battery from being subjected to heavier damage when swelling occurs in a battery module due to overcharging.

2. Description of the Related Art

Recently, secondary cells that can be charged and discharged have become widely used as an energy source for wireless mobile devices. In addition, secondary cells have also gained attention as a power source for electric vehicles (EV), hybrid vehicles (HV), and the like, which are regarded as one approach to solving the air pollution caused by gasoline vehicles, diesel vehicles, and the like of the related art that use fossil fuels. While one or two or more battery cells are used for a single device in small mobile devices, a mid- or large-sized battery pack, in which many battery cells functioning as unit cells are electrically connected, is used in mid- or large-sized devices such as automobiles.

Since it is preferred that the mid- or large-sized battery pack be fabricated to be as small and light as possible, small angled cells, pouch type cells, or the like, which can be stacked with a high degree of integration while at the same time having a small weight per capacity, are widely used as battery cells of the mid- or large-sized battery pack. Among these, pouch type cells are especially advantageous, since they are light, have a low possibility of the electrolyte solution leaking, and are inexpensive to fabricate.

Although nickel hydrogen secondary cells have been widely used for these unit cells (i.e. battery cells) of the mid- or large-sized battery pack, development of lithium secondary cells, which provide higher output compared to capacity, have been proposed as a possible alternative. However, lithium secondary cells have low stability. In particular, pouch type cells are strong candidates as the unit cells of mid- or large-sized battery packs, because of the various advantages described above. However, they have low mechanical strength, and leak an inflammable substance (i.e., electrolyte) when a sealant is detached, thereby increasing the risk of a fire. In the mid- or large-sized battery pack, in which multiple unit cells are electrically connected for the purpose of high power and mass capacity, a fire can be extremely dangerous.

Furthermore, in the lithium polymer battery using a pouch, the voltage increases when each cell is overcharged, since an integrated cell is filled with the entire electrolyte. In addition, due to the excessive heat created, the electrolyte inside the cell decomposes to generate inflammable gas inside the cell, thereby causing swelling, i.e. expansion of the pouch. Moreover, a membrane between a cathode and an anode may melt causing a short circuit between the cathode and the anode, thereby causing a fire. Thus, the safety of the vehicle cannot be ensured.

In consideration of such problems, the technique was introduced to prevent overcharging by cutting off power from a battery by deforming a cover of a battery cell when the battery cell swells in response to the battery being overcharged, as shown in FIG. 1. Although this approach may prevent the overcharging, terminal parts are broken in the process, thereby rendering an expensive battery pack useless. Furthermore, toxic gas that occurs during the swelling may threaten the safety of consumers.

SUMMARY OF THE INVENTION

Accordingly, the present invention has been made keeping in mind the above problems occurring in the related art, and is intended to minimize the swelling of a battery pack even if the swelling occurs when a battery is overcharged, to prevent a battery pack from being damaged, and furthermore, to prevent toxic gas from being exhausted by minimizing the swelling In order to achieve the above objective, according to one aspect of the present invention, there is provided an apparatus for preventing a battery from being overcharged, including a battery module having a plurality of battery cells; a battery controller connected to the battery module, the battery controller having a voltage sensor; a mounting frame arranged with an interval from the battery module, the mounting frame being made of a conductor; and a ground connected to the mounting frame to ground the mounting frame. In particular, the battery controller determines that overcharging has occurred when the voltage sensor senses a low voltage.

Conversely, the voltage sensor senses a high voltage when the battery module normally operates but sense a low voltage when the battery module comes into contact with the mounting frame as a result of swelling due to overcharging.

More specifically, the battery module may include a conductor panel in a portion that opposes the mounting frame, and the battery controller may turn on a warning light when the voltage sensor determines that overcharging has occurred. Furthermore, the battery controller may stop charging the battery module when the voltage sensor determines that overcharging has occurred.

In order to achieve the above objective, according to another aspect of the present invention, there is provided an apparatus for preventing a battery from being overcharged, including a first battery module having a plurality of battery cells; a second battery module having a plurality of battery cells, the second battery module being arranged so that it is separated from the first battery module by a repetitive predetermined distance; a battery controller connected to the first battery module, the battery controller having a voltage sensor; and a ground connected to the second battery module to ground the mounting frame. More specifically, the battery controller determines whether or not overcharging has occurred when the voltage sensor senses a low voltage.

Conversely, the voltage sensor sense a high voltage when both the first and second battery modules are normally operating but sense a low voltage when any one of the first and second battery modules comes into contact with the other one of the first and second battery modules as a result of swelling due to overcharging.

In particular, the first and second battery modules may include conductor panels in portions that oppose each other, and the battery controller may turn on a warning light when the voltage sensor determines that overcharging has occurred. Furthermore, the battery controller may stop charging the first and second battery modules when the voltage sensor determines that overcharging has occurred.

Advantageously, the present invention makes it possible to minimize the swelling of the battery cell even if the swelling occurs when the battery is overcharged. In addition, the present invention makes it possible to minimize damage to the battery pack even if the battery is overcharged. Furthermore, the present invention makes it possible to prevent toxic gas from being exhausted by minimizing the swelling due to the overcharging.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a circuit diagram of the apparatus for preventing a battery from being overcharged according to the exemplary embodiment shown in FIG. 4.

DETAILED DESCRIPTION OF THE INVENTION

Figure 1:
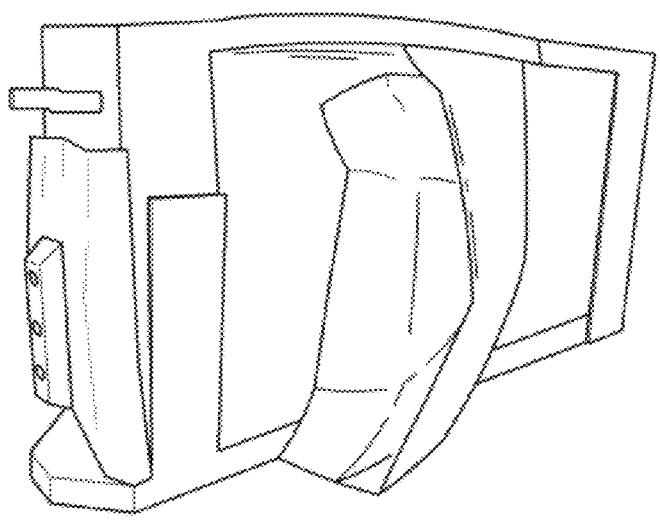
FIG. 1 is a view showing an apparatus for preventing a battery from being overcharged of the related art.

Reference will now be made in greater detail to exemplary embodiment of the invention, an example of which is illustrated in the accompanying drawings. Wherever possible, the same reference numerals will be used throughout the drawings and the description to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
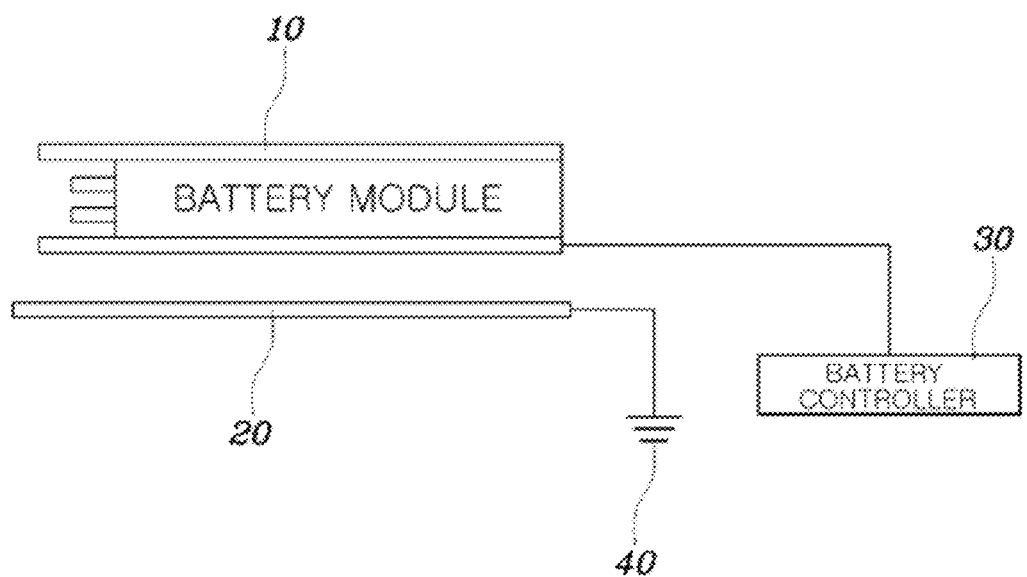
FIG. 2 is a configuration view of an apparatus for preventing a battery from being overcharged according to an exemplary embodiment of the present invention.
Figure 3:
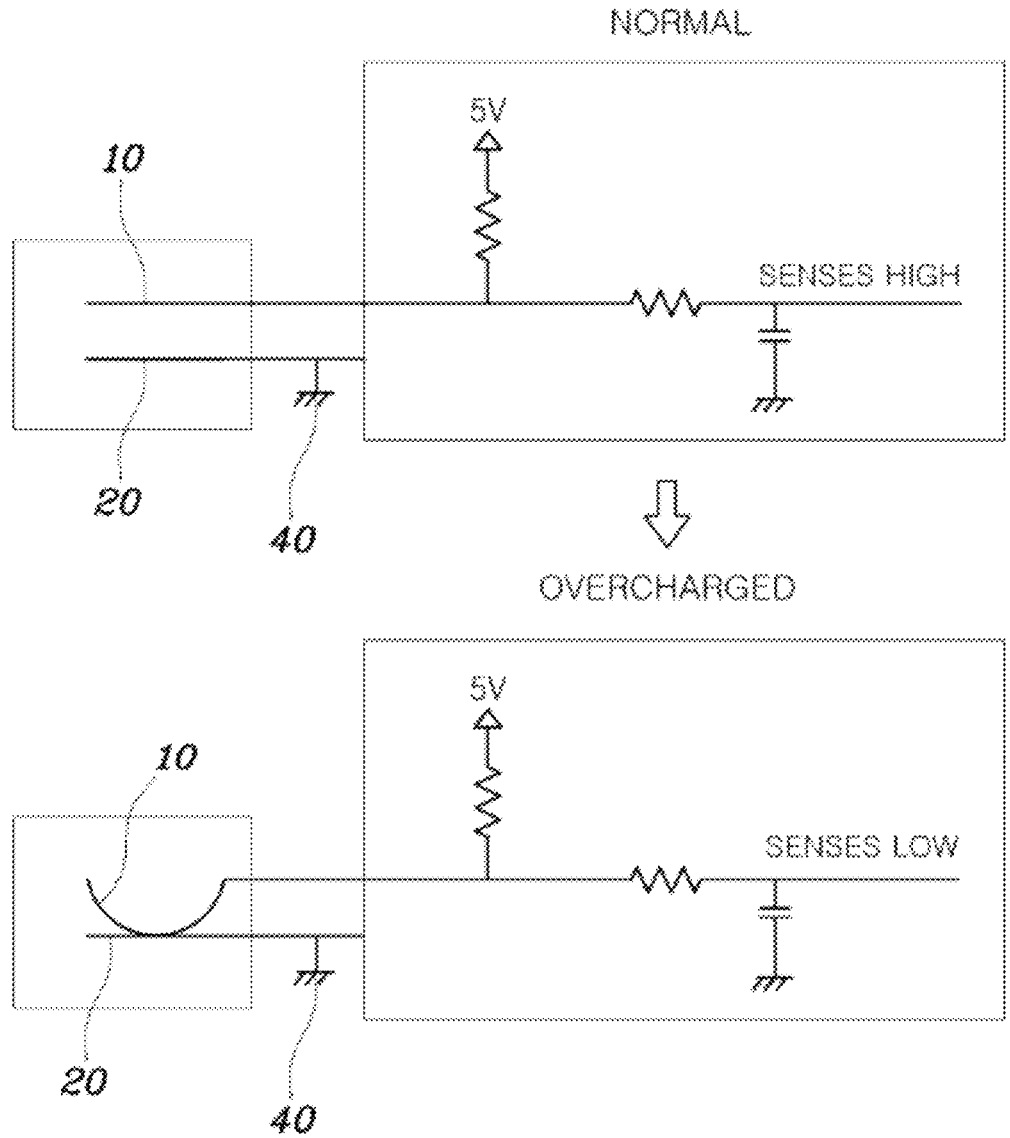
FIG. 3 is a circuit diagram of the apparatus for preventing a battery from being overcharged according to the exemplary embodiment shown in FIG. 2.

FIG. 2 is a configuration view of an apparatus for preventing a battery from being overcharged according to an embodiment of the present invention, and FIG. 3 is a circuit diagram of the apparatus for preventing a battery from being overcharged according to the embodiment shown in FIG. 2. The embodiment shown in FIG. 2 is an apparatus for preventing a battery from being overcharged, the apparatus including one battery module 10, which includes a plurality of battery cells. As shown in the figure, a mounting frame 20 is arranged a predetermined distance from a battery module 10. The mounting frame 20 is made of a conductor, and serves as an element that fixes the battery module 10 without electrically contacting the battery module 10.

A battery controller 30 is connected to one portion of the battery module 10, and serves to control the battery, including charging and discharging of the battery. In illustrative embodiments of the present invention, the battery controller 30 serves to sense a voltage using a voltage sensor (not shown) provided therein. A ground 40 is connected to a portion of the mounting frame 20, and serves to ground the mounting frame 20 at 0V.

Preferably, the battery module 10 includes a conductor panel, i.e. an electrical conductor, in a portion that opposes the mounting frame 20 such that an electrical contact is made when it contacts the mounting frame 20 due to swelling. Here, the electrical contact refers to a contact between two objects such that current can flow between the two objects.

As shown in FIG. 3, when the battery module 10 normally operates, the voltage sensor of the battery controller 30 senses "a high voltage." When swelling occurs due to overcharging of the battery module 10, the battery module 10 swells to the outside. The battery module 10 then contacts the mounting frame 20, and the voltage sensor of the battery controller 30 senses "a low voltage" due to the ground 40. When "a low voltage" is sensed, the battery controller 30 determines that overcharging has occurred, and accordingly turns on a warning light or stops charging the battery module 10.

Figure 4:
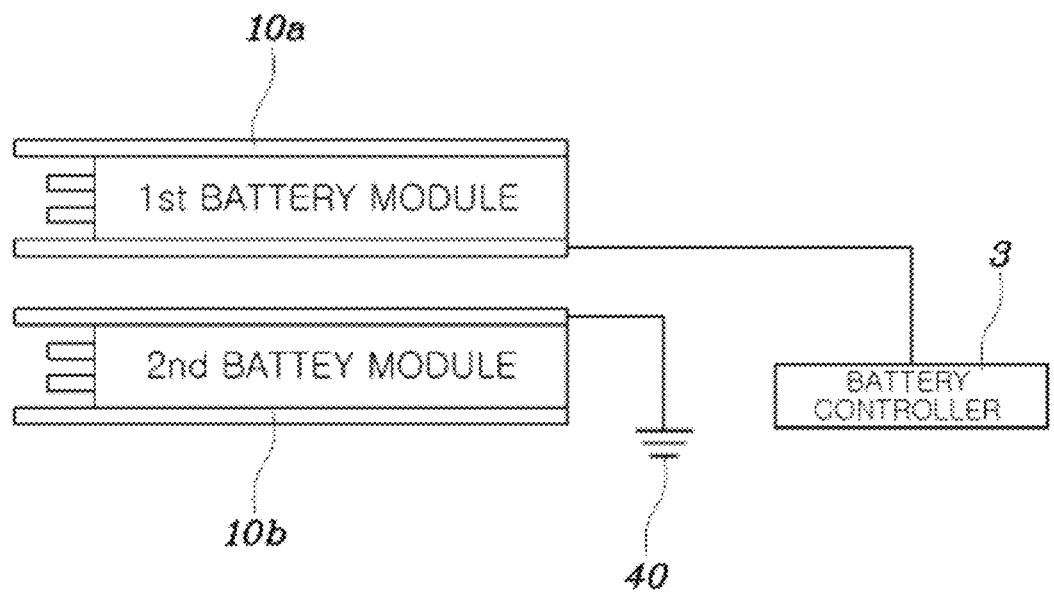
FIG. 4 is a configuration view of an apparatus for preventing a battery from being overcharged according to another exemplary embodiment of the present invention.

FIG. 4 is a configuration view of an apparatus for preventing a battery from being overcharged according to another embodiment of the present invention, and FIG. 5 is a circuit diagram of the apparatus for preventing a battery from being overcharged according to the embodiment shown in FIG. 4. The embodiment shown in FIG. 4 shows the apparatus for preventing a battery from being overcharged, which includes two battery modules, i.e. a first battery module 10a and a second battery module 10b. Each of the battery modules 10a and 10b includes a plurality of battery cells. The second battery module 10b is arranged so that it is separated from the first battery module 10a by a predetermined distance or interval.

The battery controller 30 is connected to one portion of the first battery module 10a, and serves to control the battery, including charging and discharging of the battery. In this exemplary embodiment of the present invention, the battery controller 30 serves to sense a voltage using a voltage sensor (not shown) provided therein. A ground 40 is connected to a portion of the second battery module 10b, and serves to ground the second battery module 10b at 0V.

Preferably, the first and second battery modules 10a and 10b include conductor panels, which are electrical conductors, in portions that oppose each other such that an electrical contact is made between the conductor panels when swelling occurs.

As shown in FIG. 5, when the battery modules 10a and 10b normally operate, the voltage sensor of the battery controller 30 senses "a high voltage." When swelling occurs due to overcharging of one of the battery modules 10a and 10b, the corresponding battery module swells to the outside. The battery modules 10a and 10b then contact each other, and the voltage sensor of the battery controller 30 senses "a low voltage" due to the ground 40. When it senses "a low voltage," the battery controller 30 determines that overcharging has occurred, and accordingly turns on a warning light or stops charging the battery modules 10a and 10b.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for preventing a battery from being overcharged, comprising:
    a battery module including a plurality of battery cells;
    a battery controller connected to the battery module, the battery controller having a voltage sensor;
    a mounting frame arranged a predetermined distance from the battery module, the mounting frame being made of a conductor; and
    a ground connected to the mounting frame to ground the mounting frame,
    wherein the battery controller determines that overcharging to the battery module has occurred when the voltage sensor senses a low voltage, and
    wherein the battery module includes a conductor panel in a portion that opposes the mounting frame.

2. The apparatus of claim 1, wherein the voltage sensor senses a high voltage when the battery module normally operates, but senses a low voltage when the battery module comes into contact with the mounting frame as a result of swelling due to overcharging.

3. The apparatus of claim 1, wherein the battery controller turns on a warning light when the voltage sensor is determined to sense that overcharging has occurred.

4. The apparatus of claim 1, wherein the battery controller stops charging the battery module when the voltage sensor is determined to sense that overcharging has occurred.

5. An apparatus for preventing a battery from being overcharged, comprising:
    a first battery module including a plurality of battery cells;
    a second battery module including a plurality of battery cells, the second battery module arranged to be separated from the first battery module by a predetermined distance;
    a battery controller connected to the first battery module, the battery controller having a voltage sensor; and
    a ground connected to the second battery module to ground the mounting frame,
    wherein the battery controller determines that overcharging to the battery module has occurred when the voltage sensor senses a low voltage, and
    wherein the first and second battery modules include conductor panels in portions that oppose each other.

6. The apparatus of claim 5, wherein the voltage sensor senses a high voltage when both the first and second battery modules normally operate, but senses a low voltage when any one of the first and second battery modules comes into contact with the other one of the first and second battery modules as a result of swelling due to overcharging.

7. The apparatus of claim 5, wherein the battery controller turns on a warning light when the voltage sensor is determined to sense that overcharging has occurred.

8. The apparatus of claim 5, wherein the battery controller stops charging the first and second battery modules when the voltage sensor is determined to sense that overcharging has occurred.

9. A method for preventing a battery from being overcharged, comprising:
    controlling, by a battery controller, charging and discharging of a battery module that includes a plurality of battery cells;
    monitoring a voltage by a voltage sensor connected to the battery controller; and
    determining, by the battery controller, that overcharging to the battery module has occurred when the voltage sensor senses a low voltage due to the battery module coming in contact with a mounting frame arranged a predetermined distance from the battery module,
    wherein the battery module includes a conductor panel in a portion that opposes the mounting frame.

10. The method of claim 9, further comprising sensing a high voltage when the battery module normally operates, and a low voltage when the battery module comes into contact with the mounting frame as a result of swelling due to overcharging.

11. The method of claim 9, further comprising turning on, by the battery controller, a warning light when the voltage sensor is determined to sense that overcharging has occurred.

12. The method of claim 9, wherein the battery controller stops charging the battery module when the voltage sensor is determined to sense that overcharging has occurred.

* * * * *